(No Model.)
S. L. COWAN.
COFFEE GRINDER.
No. 420,773. Patented Feb. 4, 1890.
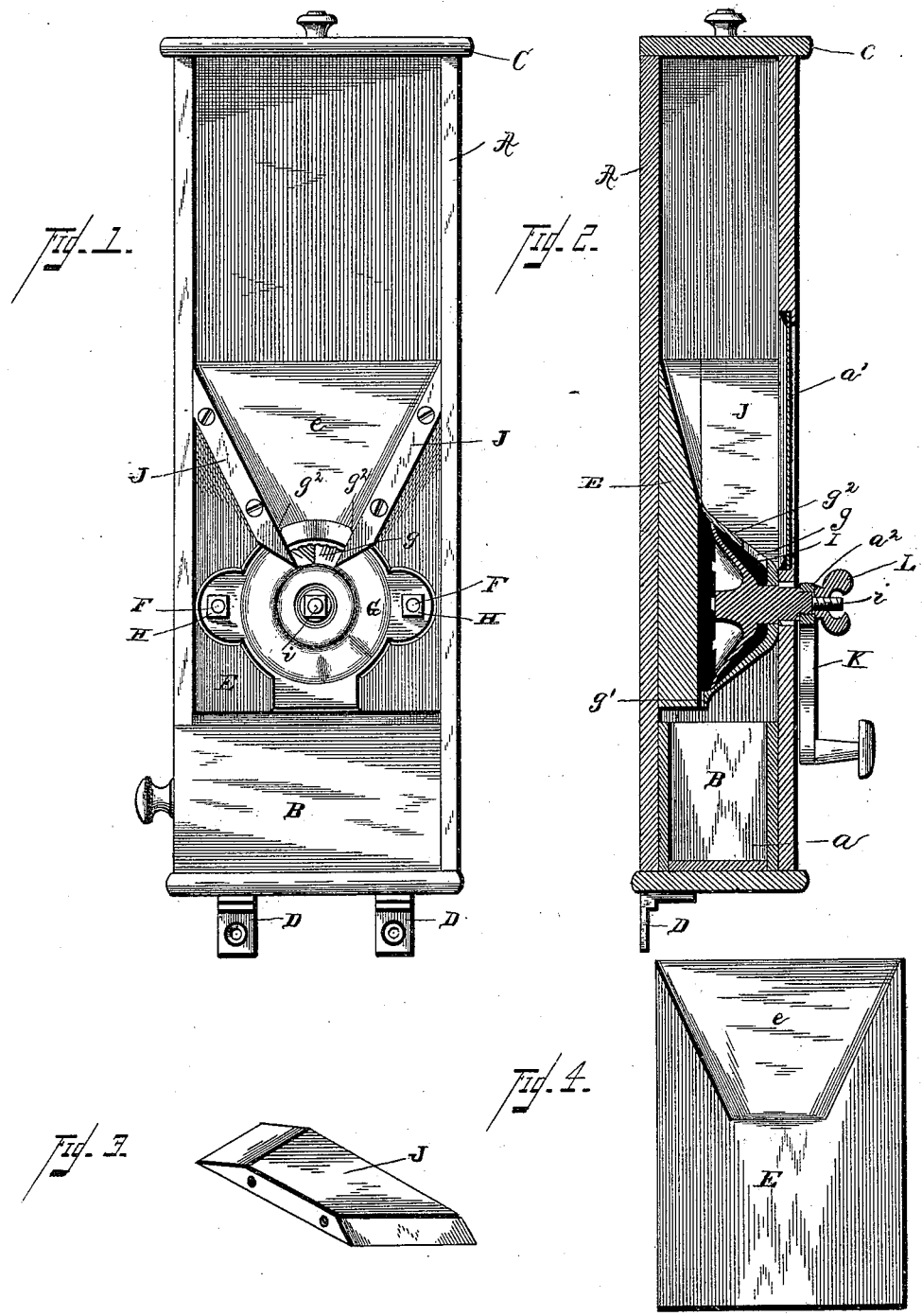
WITNESSES:
F. L. Durand
A. L. Morsell
INVENTOR:
Samuel L. Cowan
by Louis Bagger & Co.
Attorneys

UNITED STATES PATENT OFFICE.

SAMUEL L. COWAN, OF CLARKSBURG, INDIANA, ASSIGNOR OF ONE-HALF TO CLINTON B. EMMERT, OF SAME PLACE.

COFFEE-GRINDER.

SPECIFICATION forming part of Letters Patent No. 420,773, dated February 4, 1890.

Application filed August 28, 1889. Serial No. 322,221. (No model.)

*To all whom it may concern:*

Be it known that I, SAMUEL L. COWAN, a citizen of the United States, and a resident of Clarksburg, in the county of Decatur and State of Indiana, have invented certain new and useful Improvements in Coffee-Grinders; and I do hereby declare that the following is a full, clear, and exact description of the invention, which will enable others skilled in the art to which it appertains to make and use the same.

My invention has relation to coffee-mills; and it consists more particularly in the improved construction and combination of parts of the same, whereby the coffee is fed to the serrated grinders in a simple and expeditious manner, so as to insure the action of the latter upon all the berries as they are fed in the mill without liability of any escaping the action of the opposing conical disks, and, furthermore, has relation to an improved construction, whereby the coffee may be conveniently ground in either fine or coarse grains; and with these ends in view it consists in the improved construction and combination of parts of the same, as hereinafter more fully described and set forth.

In the drawings, Figure 1 is a front elevation showing the front of the casing removed. Fig. 2 is a longitudinal vertical sectional view. Fig. 3 is a detail view, in perspective, of one of the guide-strips, and Fig. 4 is a detail view, in plan, of the back-supporting plate.

Like letters of reference denote like parts throughout the several figures.

Referring to the drawings, the letter A represents the outer casing or mill provided at its lower end with an opening $a$, into which a drawer B is inserted. This receptacle is also provided with a suitable cover C, and its bottom piece has secured thereto suitable brackets D D, for the purpose of securing the mill conveniently against a wall or other support.

The letter E represents the cone and shell supporting plate, said plate being provided on its front face with an approximately-V-shaped depression or recess $e$, and is secured to the back piece of the casing or mill by means of screws or equivalent fastening devices. This plate has also extending therefrom screw-threaded bolts F F, which pass into the apertured flanges of the shell G. These screw-bolts are adapted to receive suitable nuts H H, in order to hold the shell in position. This shell is further provided with the usual top and bottom openings $g$ $g'$ for the passage of the coffee-berries between it and the cone I and their exit into the drawer after the grinding has been completed.

Guide-strips J J extend obliquely from the top opening $g$ of the shell and have their opposite ends upon the outer sides beveled, so as to effect a neat joint. These guide-strips, together with the V-shaped depression, form a flaring entrance for the coffee-berries to the shell, and as the lower ends of the strips bear closely against the edges of the openings in the shell, grooves $g^2$ $g^2$ being formed therein for their reception, it is impossible for the coffee to escape action of the cone, thus providing a most effectual coffee-grinder.

It will be noticed that the front piece of the mill or casing is provided with an elongated glass-covered opening $a'$, by means of which the operator can at all times be able to inspect the interior of the mill, so that any clogging of the parts or other defects may be readily discernible. Below this elongated opening is a circular aperture $a^2$, through which the screw-threaded shank $i$ of the cone passes. This shank is adapted to receive a crank or handle K and wing-nut L.

Having thus described my invention, what I claim, and desire to secure by Letters Patent of the United States, is—

The combination, with an outer casing or receptacle provided at its lower end with an opening, a drawer fitting therein, and a shell and a cone, of the supporting-plate E, provided with the V-shaped depression or recess $e$, and the guide-strips J J, having their opposite ends upon their outer sides beveled and their lower ends fitting in grooves $g^2$ $g^2$ in the shell G, substantially as described.

In testimony that I claim the foregoing as my own I have hereunto affixed my signature in presence of two witnesses.

SAMUEL L. COWAN.

Witnesses:
CORNELIUS CAIN,
CLINTON B. EMMERT.